Jan. 25, 1966 J. MacMANUS 3,230,906
METHOD AND APPARATUS FOR DEPOSITING WHIPPED
PRODUCTS ON CONFECTIONS
Filed Feb. 18, 1963 3 Sheets-Sheet 2
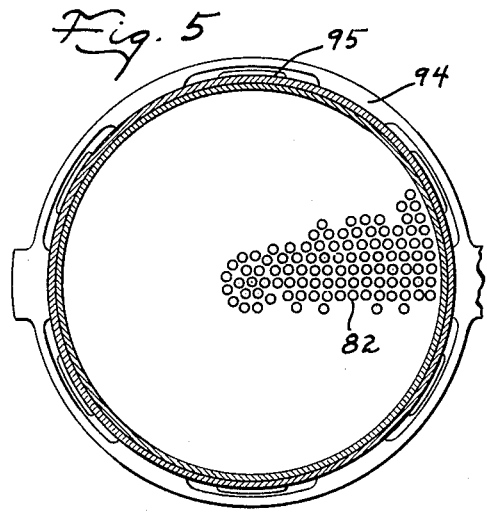
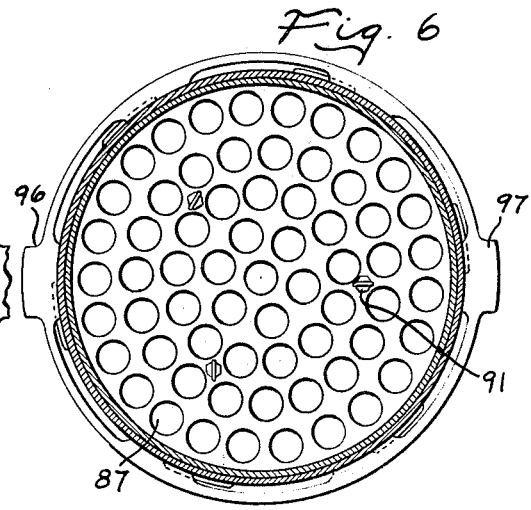
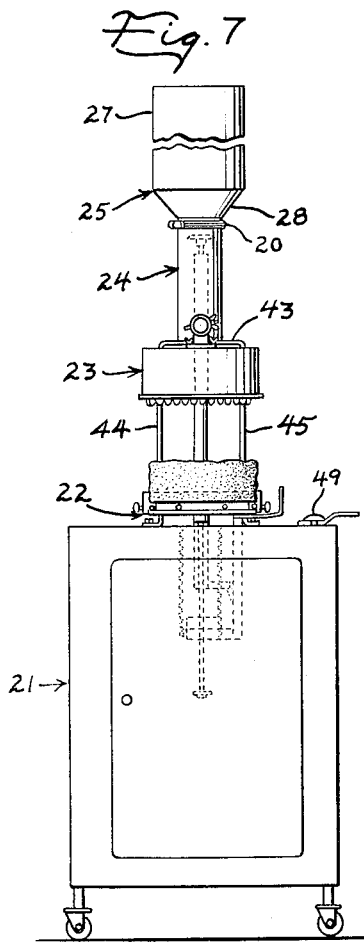
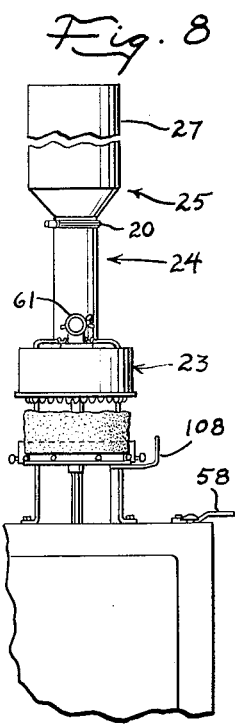
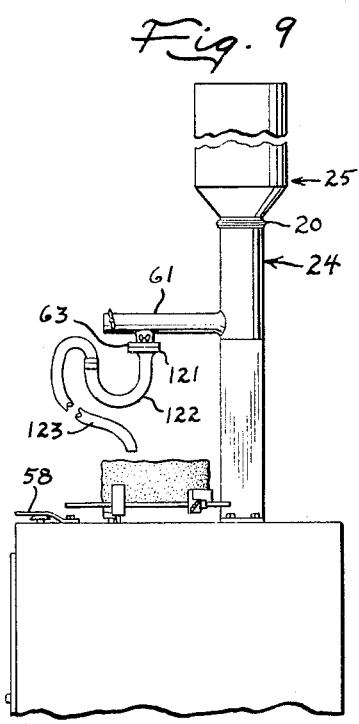
Inventor
John MacManus
By McCanna, Morsbach & Pillote
Attorney's

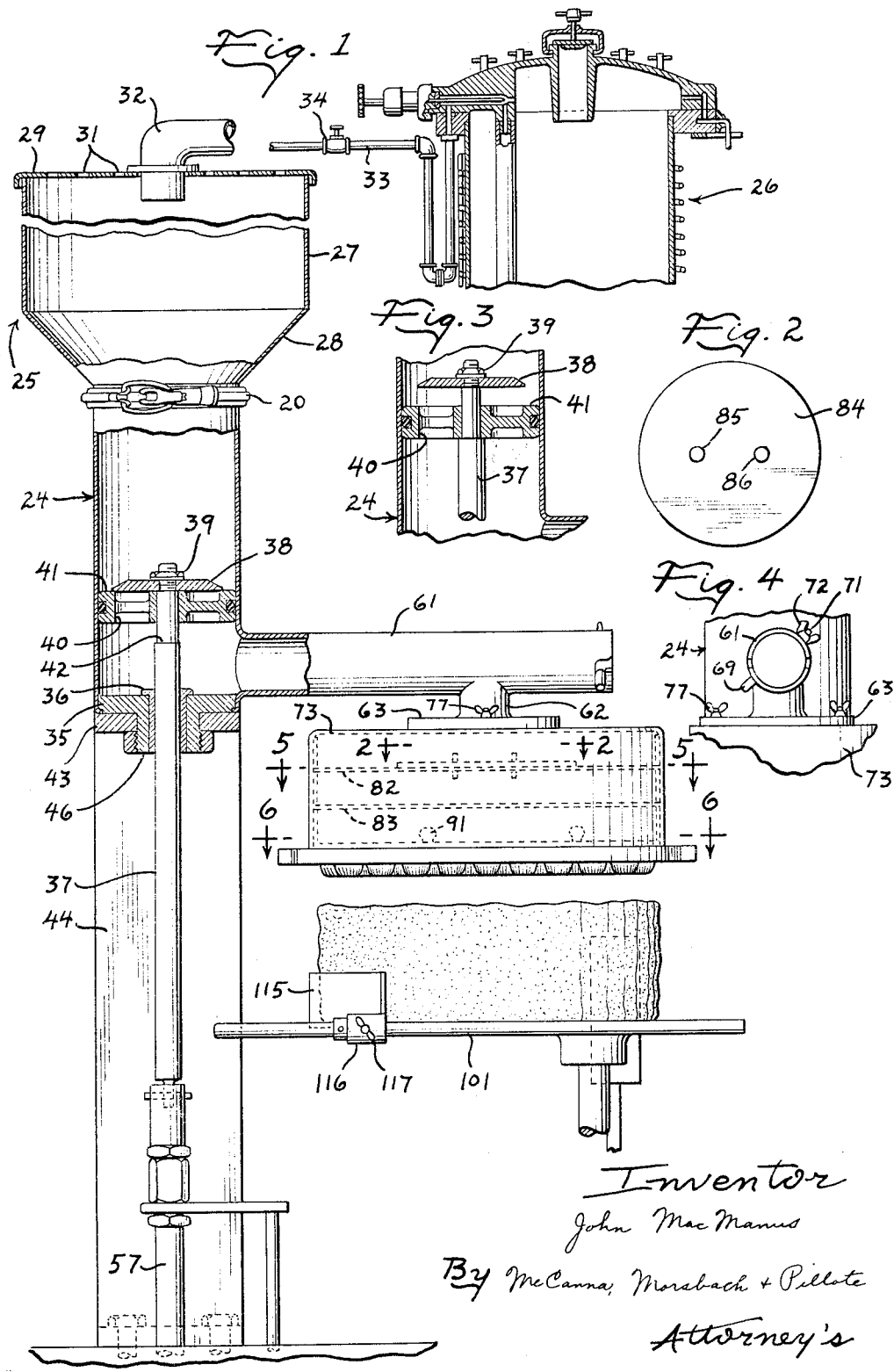

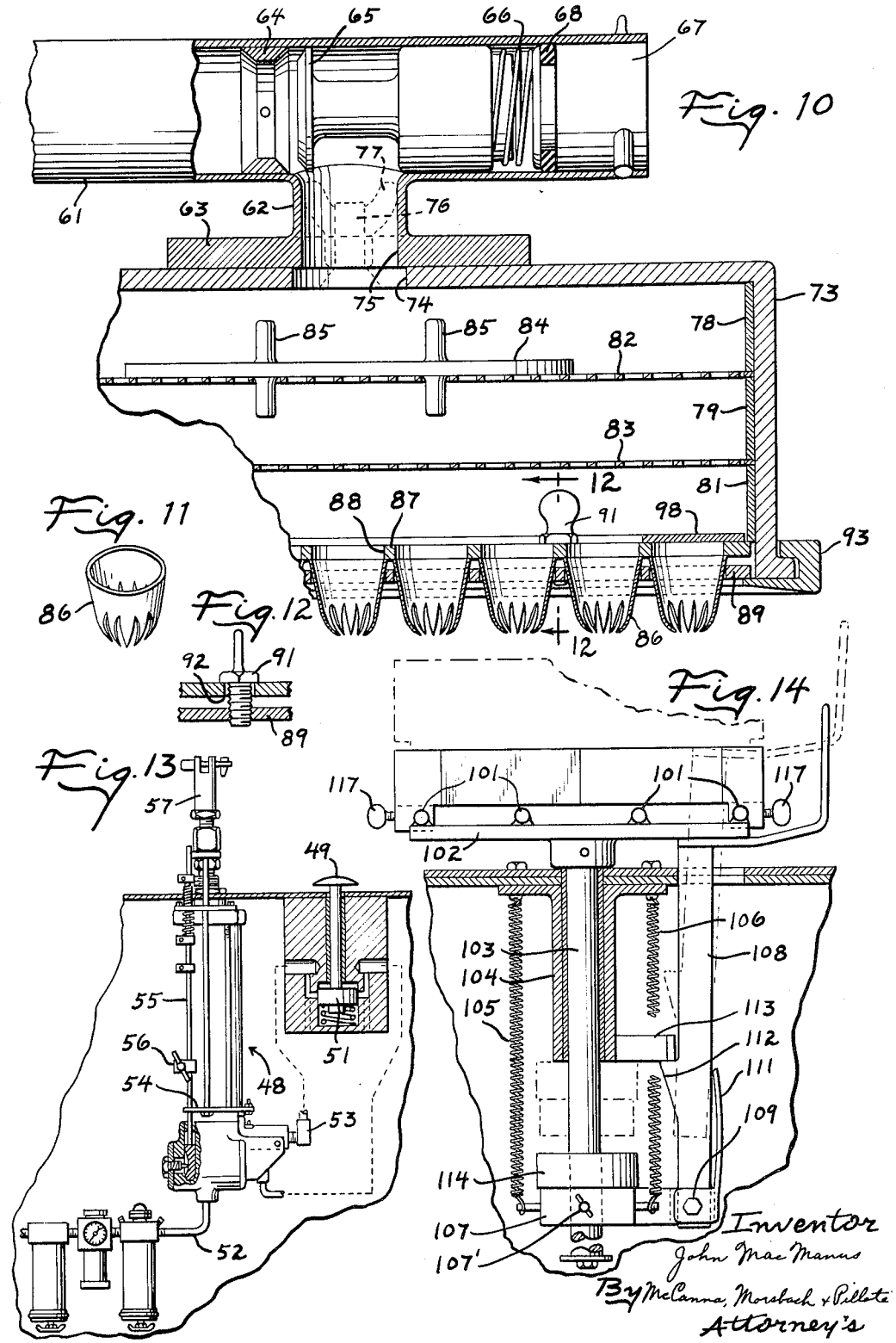

United States Patent Office 3,230,906
Patented Jan. 25, 1966

3,230,906
METHOD AND APPARATUS FOR DEPOSITING
WHIPPED PRODUCTS ON CONFECTIONS
John MacManus, 143—16 23rd Ave., Whitestone, N.Y.
Filed Feb. 18, 1963, Ser. No. 259,012
8 Claims. (Cl. 107—54)

This invention relates to methods and apparatus for depositing whipped foam products and the like on cakes, pies and other bakery type confections and other dessert foods.

Aerated emulsions, of which whipped cream is a familiar example, when employed as cake toppings, are in great demand by the customers who seek ready to eat commercial bakery goods, but however, these items are in short supply. This demand has not been satisfied by the commercial bakers, due to a number of factors including inadequate decorating machines, lack of uniformity of the output of such machines and particularly the lack of flexibility for making multiple varieties on such machines as were heretofore available, spoilage in the application of the aerated cake toppings, and the current high and continuously increasing labor cost of skilled craftsmen.

When a whipped topping is so highly aerated as to have an overrun value of about 120%, for example, it has never been possible with the equipment heretofore available to mechanically deposit interchangeably and with such perfection the foamed product through multiple and/or single nozzles and for flexible tubes on a satisfactory commercial basis. This method and machine provides the proper tool for the first time.

Deterioration in the texture of the whipped product, and reduction of the volume ratio of the air to the liquid and irregularity in the deposits have been common faults. Resort to hand methods of decorating has become too costly for economical commercial operations, because of a shortage of able craftsmen and the high cost of such personnel. Thus, the great sales potential of whipped topping goods has never been realized, and the consumer desire for low cost desserts and the like has not been satisfied by the commercial baker. This invention with its combination as later described completely eliminates the problems above mentioned and provides the foolproof means for making substantial profit by meeting customer needs.

To cater to this demand at a price which will be readily acceptable to the consumers yet profitable to the baker, the latter has long needed a versatile decorating machine of small physical dimensions and low initial cost which can receive a highly aerated whipped emulsion of uniform texture and, without any substantial loss of volume or alteration of the texture of the emulsion, deposit efficiently and rapidly selected uniform designs upon a succession of cakes. For the successful display and sale of large numbers of such bakery goods, uniformity is an essential. The machine of this invention makes possible the attainment and assurance of such uniformity.

The general object of this invention is to provide a new combination in an improved confection decorating and tubing apparatus adapted for efficiently depositing on cakes and the like whipped and the like products in an easily controlled uniform manner with great perfection of design which can be varied easily and yet the machine is low in cost and small in dimensions.

A particular object of the invention is to provide an apparatus which can handle and deposit highly aerated foam products without any substantial diminution in the volume thereof or lessening of the air to liquid ratio.

Another object is to provide cake decorating apparatus so designed and constructed that it can be operated with uniform and consistent success by an employee having less decorating skill than has been heretofore required for conventional hand decorating methods.

This invention provides the means for maintaining the highest standards of sanitation as to method and construction, provides ease of assembly and disassembly for cleaning and sterilization thereby eliminating the current unsanitary methods which are now used even by skilled craftsmen.

Other objects and advantages of the invention will be mentioned hereinafter or will become apparent from a perusal of the following specification, in which a preferred embodiment of the invention is shown and described, as illustrative of the nature and mode of operation of the invention.

Referring now to the drawings, FIGURE 1 is a side elevational view, with some parts in section, showing a portion of the apparatus of the invention, and its association with a whipping apparatus.

FIG. 2 is a plan view of a deflector used in the decorator head, elsewhere shown in FIG. 10.

FIG. 3 is a sectional view of a pump piston.

FIG. 4 is a detail showing the end of the horizontal pipe which delivers foam products to the decorator head.

FIG. 5 is a sectional view on line 5—5 of FIG. 1.

FIG. 6 is a sectional view on line 6—6 of FIG. 1.

FIG. 7 is a front elevational view of the decorating apparatus, showing a cake positioned on the elevator, but omitting the whipping apparatus.

FIG. 8 is a front elevational view of the apparatus, showing a cake elevated to normal position for receiving the whipped product.

FIG. 9 is a side elevational view of the apparatus, modified by removal of the multiple nozzle decorating head and by the substitution of a single flexible hose for a manual decorating operation.

FIG. 10 is a detail in section of portions of the decorating head and its supply tube.

FIG. 11 is a perspective view of a decorating nozzle.

FIG. 12 is a detail in section on line 12—12 of FIG. 10.

FIG. 13 is an elevational view of a conventional air cylinder apparatus for actuating the product pump, together with a manual valve.

FIG. 14 is an elevational view of the cake elevator.

Referring first to FIGURES 1 and 7, the apparatus includes a base cabinet 21, a cake platform generally indicated as 22, a fixed decorating head indicated as 23, a pump cylinder 24, a hopper generally indicated as 25 and a preferred form of whipping apparatus generally indicated as 26, which may be connected with the decorating apparatus. The hopper is mounted on the cylinder by a clamp 20 for easy cleaning and to enable hoppers of varying heights to be used. The whipping apparatus only partially shown herein, is fully shown and described in my copending application, Serial No. 226,557, filed September 27, 1962 on an invention entitled "Whipping Apparatus."

It is preferred that the greater portion of the total vertical and sloped height of the hopper be in the vertical cylindrical portion 27, and that the tapered portion 28 be steeply inclined as it connects the hopper to the vertical pump cylinder 24. The top of the hopper may be closed by a cover plate 29 having perforations 31, for the escape of air which might be released in the hopper from prewhipped topping introduced through the feed tube 32, which is connected with tube 33 leading from the whipping apparatus. Because of a considerable difference in the drawing scales showing the hopper and that showing the apparatus 26, tubes 32 and 33 are here shown on different scales but actually are of the same size. A shutoff valve 34 may be provided in pipe 33.

When the prewhipped topping is made by impregnating the whippable material in a closed container under air pressure with millions of tiny air cells, as when made as described in my aforesaid application in the apparatus 26, a foam product of 120% and much higher overrun can easily be produced. Such a product can be stable for long periods and free from "weeping" and while it has a very desirable fine texture and high air content, these factors produce some problems in its usage. Some large air bubbles commonly may be released from the product, because it is impregnated by an excess of air, and these are expanded in the hopper and caused to escape from the hopper through perforations 31. Were they not so removed, some of them would interfere with the uniformity of the later deposited topping.

The foamy texture and low specific gravity of the mass of foam also make the product unsuitable to feed merely by gravity from a conventional conical hopper. I have found, however that, if the vertical height of the conical section 28 of the hopper be considerably less than the height of the superposed vertical cylindrical section 27, the foamy mass will feed downwardly uniformly into the pump cylinder under the action of gravity, atmospheric pressure and the pump suction. Hence, no mechanical agitators are needed for expelling the product, with such attendant destruction of its texture and loss of volume as may well result.

The construction of the hopper while not essential to all features of the invention contributes greatly to operation of the combination and method and provides improved sanitation. One serious problem in the use of conventional hoppers in such a combination is that of obtaining uniform feed of the material through the hopper and preventing the formation of a vortex so that a part of the material clings along the side of the hopper. It should be noted that this problem is severe because of the nature of whipped products which do not flow readily. This action is objectionable for a number of reasons, one being that the product is perishable and tends to alter its characteristics when it clings for extended periods of time along the walls of the hopper. Furthermore when so disposed it is in contact with the surrounding air where it is apt to become contaminated.

To avoid this action and to obtain additional advantages the hopper is so constructed that the side walls in their upper portions are vertical. The hopper is arranged to have a diameter in the region of twice the diameter of its outlet and of the inlet to the pump cylinder presently to be described. Furthermore, when used to perform the method described, it becomes important to maintain its volume relatively small in order to minimize the waste of material when the system is put into operation. With a whipping apparatus such as shown in FIG. 1 for example, because of the design and size of the hopper the so-called "run off" can be kept in the region of one pound of product whereas in previously known and much more expensive machines, the run off may be as much as one hundred pounds of product. This factor alone precludes the use of such equipment by most retail and small commercial bakeries.

A cylinder base block 35 is secured as by welding at the bottom end of the pump cylinder 24 and, together with a suitable sealing sleeve 36, guides the piston rod 37. On the initiation of the upstroke of piston rod 37, the valve 38 secured to the top of the rod by nut 39 will rise relatively to piston, uncovering one or more ports 40 in the piston 41. When the annular shoulder 42 on the piston rod engages the underside of the piston, the latter will rise and the whipped product in the pump cylinder will flow through and below the piston. On a subsequent downstroke of the piston rod, valve 38 will close and carry the piston downwardly. On this downstroke the whipped product above the piston will follow by the combined action of gravity, atmospheric pressure and pump suction, but central channelling action in the hopper does not occur as the product level is lowered.

The pump cylinder 24 is supported on and secured in any suitable manner to the horizontal section 43 of an inverted U-shaped bracket whose vertical legs 44 and 45 are bolted to the top of the cabinet 21. The cylinder base block 35 includes a flanged collar 46 extending through a suitable aperture in the bracket section 43 and a nut 47 may serve to clamp the cylinder base block on the supporting bracket.

The details of construction of the conventional air cylinder 48 do not form a part of this invention, hence will not be described, but any conventional commercial air cylinder may be employed if it functions substantially in the following or in a functionally equivalent manner.

The air cylinder shown is a commercial product of Bellows-Valvair of Akron, Ohio; Model BCAEM2-60 AIR MOTOR, with end cap for poppet operation.

A manually operated air valve button 49 is mounted in the top of cabinet 21 as shown. When it is depressed, its associated valve 51 will supply air pressure from a source at 52 to the cylinder inlet 53 and, as the piston of the air cylinder rises, a conventional collar 54 connected with the piston rod will rise along rod 55 and, when it engages the adjustable stop lug 56 mounted on that rod, the rod will be lifted to open an exhaust valve for the lower power cylinder and an intake valve to admit air to the upper power cylinder to return the piston downwardly.

Such valves and piston actions are conventional, and can be rearranged so that the normal rest position for the air cylinder is with the piston rod extended. Thereafter, a single punch on the button 49 would cause the piston to lower fully and then automatically rise to rest position. It is in this manner that the air cylinder is preferably used in this invention which means that, since the air cylinder piston rod 57 is connected to operate the decorator piston rod 37, the rest position of the latter is at the top of its stroke with valve 38 open and maintaining communication between the hopper and the product cylinder below its valve and piston. A pivoted hold down lever 58 as shown in FIGS. 8 and 9 may be employed at will to hold down the button 49 if repeated pump operation is desired for a period of time to create a continuous flow of product, this is a desirable feature of the invention because when the button 49 is retained closed, the rapid speed of the pump which may be adjusted from one to 350 strokes per minute together with the adjustable range of deposit at each stroke which can be varied from ⅛ ounce to 8 ounces or more per stroke enables the production of a wide variety of products with the greatest simplicity of changeover. Ordinarily, one downstroke of the product piston 41 will expel through the decorator head enough foam product to decorate a single cake.

By the simple act of resetting the adjustable stop lug 56 up or down, the length of the stroke of the air piston rod and the product piston rod may be increased or decreased respectively, thus to vary the amount of foam product delivered to the decorator head on each down stroke.

As shown in FIG. 1, a horizontal pipe 61 is welded to the pump cylinder 24 and from this pipe a short tube 62 depends, carrying a rigid circular plate 63 from which the decorating head is supported. Just above the tube 62, there is mounted in pipe 61 a valve seat 65 (see FIG. 10) against which will normally seat the check valve 65 biased toward closed position by a light spring 66 held in place by a plug 67 carrying a compressible sealing ring 68. The plug may be secured in the end of the pipe in any suitable manner, such as by engaging protruding pins 69 and 71 in bayonet slots formed in the pipe end. For added security the end of one of the pins may be threaded and a nut 72 applied thereto will clamp the plug against accidental release.

The decorating head includes the inverted pan or casing 73 whose top wall has an aperture or inlet port 74 registering with aperture 75 in plate 63 and with the tube 62. This pan may be detachably secured to plate 63 by means of studs such as 76 and wing nuts 77. The casing 73 is provided with three annular spacing rings 78, 79 and 81 to facilitate the mounting of transverse screens 82 and 83 which, with the imperforate deflector plate 84 whose locating pins 85 pierce the upper screen, serve to divert and equalize the flow of whipped product from tube 62 to the nozzles.

As this food handling apparatus must be adapted for quick dismantling for frequent cleaning, it will be noted that even the tapered nozzles 86 are individual units and are held in the casing by a pair of removable plates. The upper plate 87 has apertures 89 spaced for registration with the nozzles but of lesser diameter than the diameters of the inlet ends of the nozzles, as shown in FIG. 10. Thus, the margins of apertures 88 engage and can be clamped down on the upper edges of the nozzles.

The lower plate 89 is also pierced by apertures as shown, each to be engaged by the side wall of a nozzle. This pair of plates can be assembled with all nozzles on place outside of the casing and the plates may be locked together, clamping the nozzles as shown, by inserting a few thumb screws such as 91 through suitable apertures 92 in the upper plate and threading the screws into suitable threaded holes in bottom plate 89. (See FIG. 12.)

It should also be noted that plates having different patterns of openings, different spacings, and different shaped nozzles can be easily and quickly changed to change the decorating pattern. They and the balance of the head can be quickly disconnected for cleaning and sterilization and because of the smooth configuration of the parts, there are no interstices where material may resist cleaning.

After such outside assembling, the assembly of plates and nozzles may be inserted into the casing against spacer ring 81 and then clamped securedly in place by the clamping ring 93 which has peripherally spaced apart inwardly extending flanges 94 which, as seen in FIG. 5, can be pushed up past the level of outwardly extending peripherally spaced lugs 95 on the casing 73. Thereafter, a slight rotation of the clamping ring 93 will effect a locking reaction between the flanges and lugs, effectively clamping the nozzles and plates 87 and 89 in the casing. The projections 96 and 97 on the clamping ring are provided for convenience in gripping and rotating the ring. The entire decorator head assembly after cleaning may be reassembled upside down and then reattached to plate 63.

The annular horizontal ring 98 shown partly in FIG. 10 is illustrative of a means for covering or blanking out an outside annular row of nozzles when it is desired to prevent the discharge of topping through such nozzles. Rings of various annular widths may be employed especially to accommodate the decorator head to cakes of various diameters.

Referring now to the cake platform generally indicated at 22 in FIG. 7, the platform may consist of an assembly as shown in FIG. 14 of spaced horizontal rods 101 welded to a transverse bar 102 which is affixed in any suitable manner to the top of a vertically reciprocable shaft 103 slidable in a sleeve 104 and biased to rise normally by the action of springs 105 and 106 connected as shown to the frame and to the shaft by means of plate 107. The plate 107 may be adjusted vertically on shaft 103 by means of a conventional thumb set screw 107'. Thus the extent of elevation of the cake platform may be varied.

A manual lever 108 pivoted at 109 is biased by spring 111 to cause the latch 112 to engage the fixed projection 113 on sleeve 104, thus to hold the cake platform in lowered position. When the latch is manually disengaged, the springs will elevate the platform and present the top of the cake at the proper level beneath the nozzles. A rubber bumper 114, may be positioned on the shaft above the plate 107 fixed on shaft 103 to cushion the rise of the cake platform.

An adjustable back stop for a cake when positioned on the platform consists of a curved metal strip 115, secured at its opposite ends to sleeves 116 slidably adjustable horizontally on the platform rods 101, as seen in FIGS. 1, 7 and 8. The sleeves may be clamped by thumb screws 117.

FIGURE 9 illustrates how simple it is to remove the multiple nozzle cake decorator head from plate 63 and clamp to that plate another plate 121 carrying a curved pipe 122 to which is attached a flexible hose 123, or a plurality of hoses connected by a manifold, (all of which are herein collectively called nozzles) to be employed in manually decorating a cake, as may be advisable for special occasions. During such a manual operation, the air valve button hold down lever 58 may be used to provide continuous pumping of the foam product, if desired.

In place of a vertically reciprocable cake holding platform, there may be used a conveyor for moving a succession of cakes under the decorator head, and detaining them there momentarily to receive toppings.

The "whipping" apparatus shown partially in FIG. 1 delivers its highly aerated foam product directly to the hopper 25 as the aerated whippable material is produced. It is desirable that such immediate delivery be made, and the decorating apparatus is well adapted to receive and dispense this newly made foam product. Unavoidably, there will be some unstable large bubbles of air in the product as it enters the hopper along with the much greater proportion of fine stable air bubbles but these larger bubbles will free themselves in the enlarged space of the hopper and directly escape from the hopper. Therefore, there will be no unwanted sudden blasts or explosions of large bubbles of air at the decorator nozzles or flexible hoses, such as might spatter the foam product in all directions. The cylindrical column of foam product in the pump cylinder either above or below the piston 41 will be free of large bubbles, and on the suction stroke will be drawn downwardly in a uniform manner.

It should be understood that while a preferred embodiment of the invention is shown and described herein to illustrate the invention, modifications and variations of the invention may be employed without departing from the principles and scope of the invention defined in the appended claims.

Having shown and described my invention, I claim:

1. A method of decorating a cake or the like comprising aerating a whippable material in a closed container into a foam product by injecting air at an elevated pressure into the material and primarily forming under pressure distinct stable fine air bubbles in the mass intermingled with a lesser proportion of unstable larger air bubbles, delivering the thus aerated product as it is formed downwardly in a flowing stream substantially centrally into a hopper having vertical side walls whose upper end communicates with the atmosphere to release the larger air bubbles to the atmosphere as the stream enters the hopper and to cause the product to spread across the hopper for movement downwardly therethrough, thereafter under slight compression pumping the residual foam product from the lower end of the hopper into a decorator chamber and distributing the product in said chamber to a plurality of outlets formed as cake decorating nozzles and depositing the product on a cake positioned below the nozzles.

2. In a confection decorating apparatus, the combination of whipping apparatus having means for aerating a whippable material in a closed container with air under pressure to form a foam emulsion dominated by substantially uniform stable fine air bubbles intermingled with a substantially lesser proportion of unstable larger air bubbles, a small upright open top hopper, and outlet duct positioned to deliver the thus aerated emulsion downwardly substantially centrally into said hopper, to release the larger air bubbles to atmosphere as the foam emulsion enters the hopper and to cause the emulsion to spread outwardly across the hopper for movement downwardly therethrough and means including a decorator nozzle for pumping at low pressure the residual emulsion from the hopper through said nozzle for dispersal in the form of a decorative cake topping.

3. In a confection decorating apparatus, the combination of whipping apparatus having means for aerating a whippable material in a closed container with air at an elevated pressure forming a foam emulsion dominated by substantially uniform stable fine air bubbles intermingled with a substantially lesser proportion of unstable larger air bubbles, a small upright open top hopper, an outlet duct positioned to deliver the thus aerated emulsion downwardly substantially centrally into said hopper, to release the larger air bubbles to atmosphere as the foam emulsion enters the hopper and to cause the emulsion to spread outwardly across the hopper for movement downwardly therethrough, said hopper having vertically disposed side walls forming the upper portion of the hopper and constituting a major portion of its overall height, a pump cylinder communicating with the bottom of the hopper, a reciprocating piston in the cylinder having a valve and a valve port in its head, a duct connected to the cylinder below the piston, a decorator head communicating with said duct for the passage of emulsion therethrough, said head including at least one decorating nozzle connected to said duct for dispensing emulsion onto an object to be decorated, means for reciprocating said piston to pump said emulsion and means for adjusting the length of the stroke of said piston and the rate of reciprocation dependent upon the nature of the decorating operation.

4. In a confection decorating apparatus, the combination of whipping apparatus having means for aerating a whippable material in a closed container with air at an elevated pressure forming a foam emulsion dominated by substantially uniform stable fine air bubbles intermingled with a substantially lesser proportion of unstable larger air bubbles, an outlet duct for delivering the thus aerated emulsion, a small upright open top hopper, an outlet duct positioned to deliver the thus aerated emulsion downwardly substantially centrally into said hopper, to release the larger air bubbles to atmosphere as the foam emulsion enters the hopper and to cause the emusion to spread outwardly across the hopper for movement downwardly therethrough, a pump cylinder communicating with the bottom of the hopper and a reciprocating piston therein with a valve and valve port in its head, a duct connected to said cylinder below the piston, a hollow enlarged decorator head having an inlet port communicating with the last said duct, a plurality of individual decorator nozzles spppported in the bottom portion of said head, and emulsion dispersing means supported in said head between its inlet port and said nozzles adapted for uniformly dispersing the emulsion within the head for uniform outward flow through said nozzles.

5. In a confection decorating apparatus, the combination of whipping apparatus having means for aerating a whippable material with air at an elevated pressure in a closed container to form a foam emulsion dominated by substantially uniform stable fine air bubbles intermingled with a substantially lesser proportion of unstable larger air bubbles, a small upright open top hopper, an outlet duct positioned to deliver the thus aerated emulsion downwardly substantially centrally into said hopper, to release the large air bubbles to atmosphere as the foam emulsion enters the hopper and to cause the emulsion to spread outwardly across the hopper for movement downwardly therethrough, a pump cylinder communicating with the bottom of the hopper and a reciprocating piston therein with a valve and valve port in its head, a duct connected to said cylinder below the piston, a hollow enlarged decorator head having an inlet port communicating with the last said duct, a spring loaded check valve mounted in the last said duct ahead of the duct connection with said decorator head inlet port, a plurality of individual decorator nozzles supported in the bottom portion of said head, and emulsion dispersing means supported in said head between its inlet port and said nozzles adapted for uniformly dispersing the emulsion within the head for uniform outward flow through said nozzles.

6. The combination of claim 3 wherein the diameter of said vertically disposed side walls is not greatly in excess of about twice the diameter of the cylinder where it communicates with the bottom of the hopper.

7. A method of decorating a cake or the like comprising aerating a whippable material in a closed container into a highly aerated foam product by injecting air at an elevated pressure into the material and primarily forming under pressure distinct stable fine air bubbles in the mass intermingled with larger unstable air bubbles, delivering the thus aerated foam product as it is formed downwardly substantially centrally into a relatively small upright chamber at atmospheric pressure to cause the product to spread outwardly across the chamber for movement downwardly therethrough and to allow the larger bubbles to escape, thereafter under low pressure pumping the downwardly moving residual foam product from a low point of said chamber through a decorating nozzle onto an object to be decorated.

8. A method of decorating a cake or the like comprising aerating a whippable material in a closed container into a highly aerated foam product by injecting air at an elevated pressure into the material and primarily forming under pressure distinct stable fine air bubbles in the mass intermingled with unstable larger air bubbles, delivering the thus aerated product as it is formed in a flowing stream downwardly substantially centrally into a relatively small hopper having substantially vertical side walls whose upper end communicates with the atmosphere, to release the larger air bubbles to atmosphere as the stream enters the hopper and to cause the product to spread outwardly across the hopper for movement downwardly therethrough, thereafter under slight compression pumping the residual foam product with a reciprocating type pump from the lower end of the hopper to at least one decorator nozzle for application to an object to be decorated and adjusting the rate and length of reciprocation of the pump dependent upon the nature of the decorating operation.

References Cited by the Examiner

UNITED STATES PATENTS

| | | | |
|---|---|---|---|
| 291,381 | 1/1884 | Mitchell | 107—27 |
| 623,185 | 4/1899 | Schinneller | 118—27 |
| 961,090 | 6/1910 | Anderson | 107—27 |
| 1,243,668 | 10/1917 | Bausman | 118—14 |
| 1,583,389 | 5/1926 | Cleveland et al. | 118—14 |
| 1,647,756 | 11/1927 | Stoll et al. | 107—54 |
| 1,847,118 | 3/1932 | Larsen | 118—11 |
| 1,859,827 | 5/1932 | Jacobsen | 55—178 |
| 1,898,004 | 2/1933 | Demka et al. | 107—1.9 |
| 2,220,971 | 11/1940 | MacManus | 107—54 |
| 2,335,339 | 11/1943 | Keen | 252—359.2 X |

CHARLES A. WILLMUTH, *Primary Examiner.*

WALTER A. SCHEEL, *Examiner.*